United States Patent [19]
Boylan et al.

[11] Patent Number: 6,069,807
[45] Date of Patent: May 30, 2000

[54] COMPENSATION CIRCUIT METHOD OF OPERATIONS THEREOF AND CONVERTER EMPLOYING THE SAME

[75] Inventors: Jeffrey J. Boylan; Mark E. Jacobs, both of Dallas; Vijayan Joseph Thottuvelil, Plano, all of Tex.

[73] Assignee: Lucent Technologies Inc., Murray Hill, N.J.

[21] Appl. No.: 09/395,149

[22] Filed: Sep. 15, 1999

[51] Int. Cl.[7] .............................. H02M 3/24; G05F 1/44
[52] U.S. Cl. .............................. 363/97; 363/16; 323/288
[58] Field of Search .................................. 363/16, 40, 95, 363/97, 131; 323/282, 284, 288

[56] References Cited

U.S. PATENT DOCUMENTS

| | | | |
|---|---|---|---|
| 5,051,880 | 9/1991 | Harm et al. | 363/97 X |
| 5,347,442 | 9/1994 | Henmi et al. | 363/41 |
| 5,914,866 | 6/1999 | Eguchi et al. | 363/40 |

*Primary Examiner*—Jessica Han

[57] ABSTRACT

For use with a switched-mode power converter having a modulator that develops a drive signal for a power switch, a compensation circuit, a method of compensating for a change in an output characteristic of the converter and a converter employing the circuit or the method. In one embodiment the compensation circuit includes (1) a sensor that senses the output characteristic and (2) a filter, coupled to the sensor, that develops an intermediate signal representing a change in the output characteristic. The modulator adjusts a switching period of the drive signal as a function of the intermediate signal thereby to decrease a reaction delay of the converter.

22 Claims, 8 Drawing Sheets

COMPENSATION CIRCUIT METHOD OF OPERATIONS THEREOF AND CONVERTER EMPLOYING THE SAME

CROSS-REFERENCE TO RELATED PATENT

This application is related to U.S. Pat. No. 5,051,880 entitled "Mixed Mode Regulation Controller for a Resonant Power Converter" issued to Harm, et al. on Sep. 24, 1991. The above-listed patent is incorporated herein by reference as if reproduced herein in its entirety.

TECHNICAL FIELD OF THE INVENTION

The present invention is directed, in general, to power conversion and, more specifically, to a compensation circuit for a switched-mode power converter, a method of compensating for a change in an output characteristic of the converter and a converter employing the circuit or the method.

BACKGROUND OF THE INVENTION

A power converter is a power processing circuit that converts an input voltage waveform into a specified output voltage waveform. In many applications requiring a stable and well-regulated output, switched-mode power converters are frequently employed to advantage. Switched-mode power converters generally include an inverter, a transformer having a primary winding coupled to the inverter, a rectifier coupled to a secondary winding of the transformer, an output filter and a controller. The inverter generally includes a power switch, such as a field-effect transistor (FET), that converts an input voltage to a switched voltage that is applied across the transformer. The transformer then transforms the voltage to another value and the rectifier generates a desired voltage at the output of the converter. The output filter, typically an output inductor and an output capacitor, smooths and filters the output voltage for delivery to a load.

There are two common methods of regulating the output voltage of the converter, namely, voltage-mode control and current-mode control. In voltage-mode control, the controller typically includes an error amplifier coupled to the output of the power converter. The controller further includes a modulator coupled between the error amplifier and the power switch. The error amplifier monitors the output voltage of the power converter and generates an error signal representing a deviation between the actual output voltage and a desired output voltage. The modulator then generates a drive signal for the power switch based on the error signal. For example, the drive signal may maintain the power switch in a conduction mode while the error signal exceeds a periodic ramp signal. The drive signal may then transition the power switch to a non-conduction mode when the periodic ramp signal reaches the error signal.

In current-mode control, a current in the power converter, such as a switch current through the power switch or an inductor current through the output inductor, is substituted for, or added to, the periodic ramp signal. The output voltage of the converter is still fed back through the error amplifier circuit to provide a component of the error signal for the modulator. The aforementioned methods and variations thereof are widely used and are adequate for many loads.

Low voltage digital loads that generate fast, large amplitude step changes in output current, however, may cause the error signal to vary considerably within a switching cycle. In conventional voltage or current mode control, the switching cycle may be divided into a primary interval D (during which the power switch is in the conduction mode) and an auxiliary interval 1-D (during which the power switch is in the non-conduction mode). In trailing edge modulation, for example, the primary interval D begins with a timing circuit resetting the ramp signal to the modulator, causing the modulator to place the power switch in the conduction mode. During the primary interval D, the ramp signal continues to rise at substantially constant slope. Then, once the ramp signal reaches the error signal, the power switch is placed in the non-conduction mode to begin the auxiliary interval 1-D. During the auxiliary interval 1-D, the modulator simply waits for the timing circuit to reset the ramp signal to begin a new switching cycle.

The modulator thus exhibits an active decision process during the primary interval D. Any change in the error signal either continues to keep the power switch in the conduction mode (because the error signal is greater than the ramp signal) or places the power switch in the non-conduction mode thereby ending the primary interval D (because the error signal has dropped below the ramp signal). During the auxiliary interval 1-D, however, the modulator must wait for the timing circuit to begin the new switching cycle. Any change in the error signal resulting from changes in the operating conditions of the power converter is effectively ignored, thereby limiting the response of the power converter.

Accordingly, what is needed in the art is a circuit that allows the power converter to more rapidly respond to changes in the operating conditions of the power converter during both the primary and auxiliary intervals of a switching cycle.

SUMMARY OF THE INVENTION

To address the above-discussed deficiencies of the prior art, the present invention provides, for use with a switched-mode power converter having a modulator that develops a drive signal for a power switch, a compensation circuit, a method of compensating for a change in an output characteristic of the converter and a converter employing the circuit or the method. In one embodiment, the compensation circuit includes (1) a sensor that senses an output characteristic of the converter and (2) a filter, coupled to the sensor, that develops an intermediate signal representing a change in the output characteristic. The modulator adjusts a switching period of the drive signal as a function of the intermediate signal thereby to decrease a reaction delay of the converter.

The present invention, in one aspect, introduces the broad concept of reducing a reaction delay of a converter to a change in an output characteristic (e.g., an output voltage or an output current) of the converter. The present invention recognizes that the converter may be employed to power loads requiring fast, large amplitude changes in, for example, output current. The present invention further recognizes that changes occurring during an auxiliary interval of the power switch (when the power switch is in a non-conduction mode) may not be effectively addressed until the beginning of a new switching cycle. The present invention thus advantageously employs the compensation circuit to allow the modulator to adjust the switching period of the drive signal, as well as a duty cycle of the power switch, thereby decreasing a reaction delay of the converter to the change in the output characteristic.

In one embodiment of the present invention, wherein the converter further has a ramp generator that generates a ramp signal, the modulator includes a switching cycle comparator that modifies the ramp signal as a function of the intermediate signal. The modulator may thus adjust the switching period as a function of the ramp signal. In a related embodiment, the switching cycle comparator modifies the ramp signal by resetting the ramp signal. In an alternative but related embodiment, the switching cycle comparator modifies the ramp signal by changing a slope of the ramp signal. Those skilled in the art are familiar with the use of the ramp signal in establishing the switching period of the power switch.

In one embodiment of the present invention, wherein the output characteristic is an output voltage of the converter, the converter further has a ramp generator that generates a ramp signal and an error amplifier that compares the output voltage to a reference voltage and develops therefrom an error signal. The modulator may thus include a duty cycle comparator that receives the ramp signal and the error signal and develops therefrom the drive signal. Those skilled in the art are familiar with duty cycle comparators and their function. In a related embodiment, the compensation circuit further includes an error amplifier that compares the output voltage to a reference voltage and develops therefrom an error signal. The filter may thus develop the intermediate signal as a function of a change in the error signal.

In one embodiment of the present invention, wherein the output characteristic is an output current of the converter and the converter further has an output capacitor, the sensor includes an observer circuit, parallel-coupled to the output capacitor, that develops an output current signal representing the output current. The filter may thus develop the intermediate signal as a function of the output current signal.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
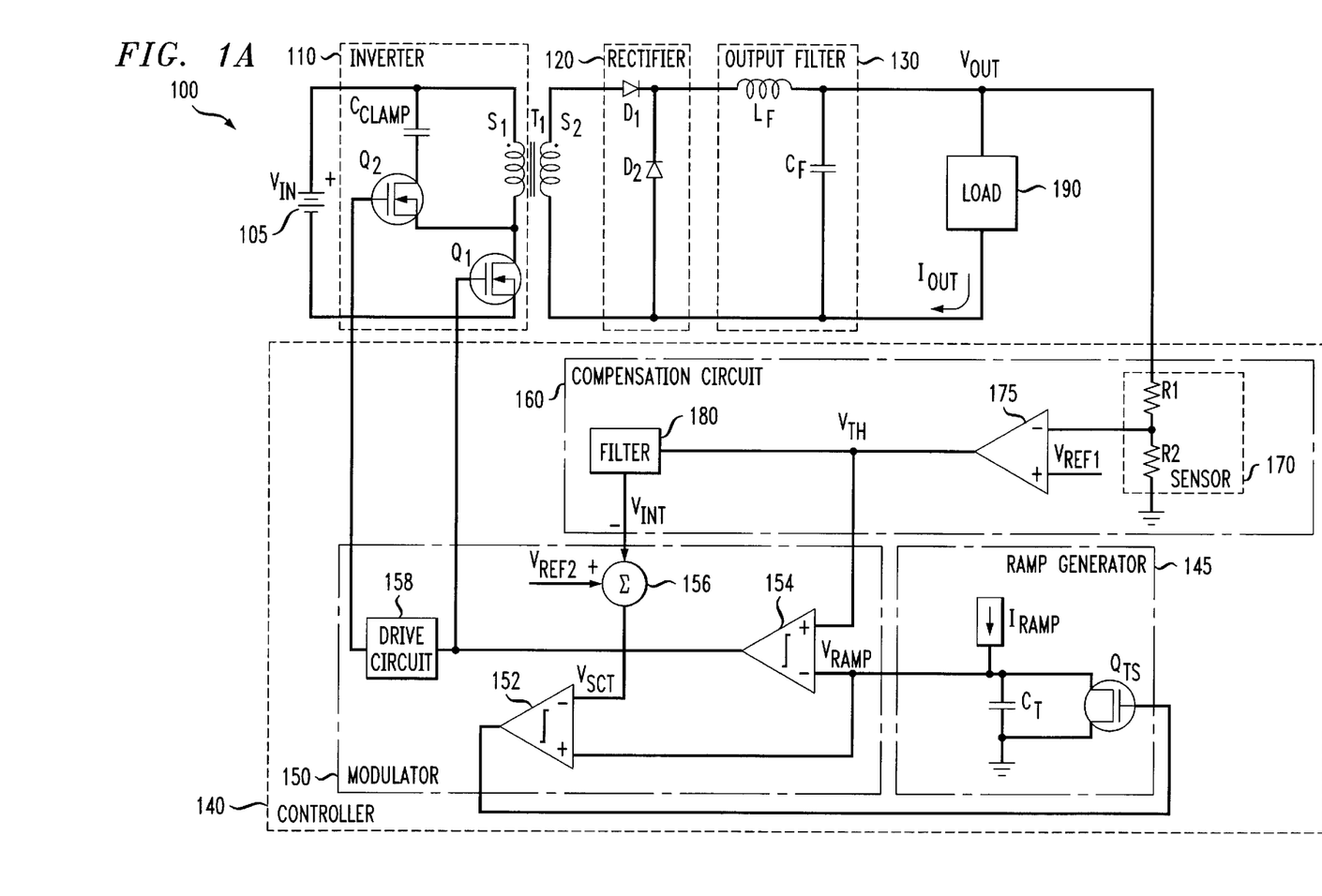
FIG. 1A illustrates a schematic diagram of an embodiment of a power converter constructed in accordance with the principles of the present invention.

Referring initially to FIG. 1A, illustrated is a schematic diagram of an embodiment of a power converter 100 constructed in accordance with the principles of the present invention. The power converter 100 includes an inverter 110 coupled to an input of the power converter 100. The power converter 100 further includes a transformer $T_1$, having a primary winding $S_1$, coupled to the inverter 110, and a secondary winding $S_2$. The power converter 100 further includes a rectifier 120, coupled to the secondary winding $S_2$, that rectifies a periodic AC waveform supplied by the secondary winding $S_2$. The power converter 100 further includes an output filter 130 coupled to the rectifier 120. The output filter 130 filters the rectified waveform from the rectifier 120 to supply an output voltage $V_{OUT}$ to a load 190 at an output of the power converter 100. The power converter 100 still further includes a controller 140, coupled to the inverter 110, that monitors the output voltage $V_{OUT}$ and adjusts the switching of the inverter 110 to maintain the output voltage $V_{OUT}$ at a substantially constant level.

The inverter 110 includes a power switch $Q_1$, coupled to the input of the power converter 100. The controller 140 intermittently switches the power switch $Q_1$ to apply a DC input voltage $V_{IN}$ across the primary winding $S_1$. In the illustrated embodiment, the inverter 110 includes a clamping circuit (having a clamping switch $Q_2$ and a clamping capacitor $C_{CLAMP}$) to reset the flux in the transformer $T_1$ during the off period of the power switch $Q_1$. While the embodiment illustrated and described shows a generic inverter 110, those skilled in the art will realize that the principles of the present invention may be employed with a wide variety of inverter topologies.

The rectifier 120 includes first and second rectifier diodes $D_1$, $D_2$ arranged in a forward topology. Of course, other rectifier topologies, including those employing synchronous rectifiers or current doublers, are well within the broad scope of the present invention. The output filter 130 includes a filter capacitor $C_F$ coupled across the output of the power converter 100. The output filter 130 further includes a filter inductor $L_F$ coupled to the filter capacitor $C_F$. Those skilled in the art realize, of course, that other output filter topologies are well within the broad scope of the present invention.

In the illustrated embodiment, the controller 140 includes a ramp generator 145, a compensation circuit 160 and a modulator 150. The ramp generator 145 includes a current source $I_{RAMP}$ coupled to a timing switch $Q_{TS}$. The ramp generator 145 further includes a timing capacitor $C_T$ coupled across the timing switch $Q_{TS}$. During a switching cycle, the current source $I_{RAMP}$ provides a current to charge the timing capacitor $C_T$, causing the ramp signal $V_{RAMP}$ to rise. At the end of the switching cycle, the timing switch $Q_{TS}$ turns on briefly to discharge the timing capacitor $C_T$ and reset the ramp signal $V_{RAMP}$. The timing switch $Q_{TS}$ then turns off to allow the current source $I_{RAMP}$ to recharge the timing capacitor $C_T$, thereby initiating another switching cycle.

The compensation circuit 160 is coupled between the output of the power converter 100 and the modulator 150. In the illustrated embodiment, the compensation circuit 160 includes a sensor 170, an error amplifier 175 and a filter 180. The sensor 170 is coupled to the output of the power converter 100 to sense an output characteristic thereof. In the illustrated embodiment, the output characteristic is the output voltage $V_{OUT}$. The sensor 170 includes a voltage scaling circuit having first and second voltage scaling resistors R1, R2. The voltage scaling circuit scales the output voltage $V_{OUT}$ to develop a scaled output voltage. Those skilled in the art are familiar with voltage scaling circuits. Of course, other types of voltage and current sensors are well within the broad scope of the present invention.

The error amplifier 175 is coupled to the sensor 170 and receives the scaled output voltage therefrom. The error amplifier 175 compares the scaled output voltage to a reference voltage $V_{REF1}$ and develops therefrom an error signal $V_{TH}$ representing a scaled difference between a desired output voltage (represented by the reference voltage $V_{REF1}$) and the actual output voltage $V_{OUT}$. Those skilled in the art will recognize that the reference voltage $V_{REF1}$ may include a signal representing an output current $I_{OUT}$ or another parameter of the power converter 100.

The filter 180 receives the error signal $V_{TH}$ and develops therefrom an intermediate signal $V_{INT}$ that preferably represents a change in the output characteristic (such as the output voltage $V_{OUT}$) of the power converter 100. In the illustrated embodiment, the filter 180 may be represented by the following equation.

$$\frac{Ks}{(\tau 1 s + 1)(\tau 2 s + 1)}$$

Of course, other filters capable of developing the intermediate signal are well within the broad scope of the present invention. Filter, as used herein, refers to a class of circuits, including passive and active filters, that is capable of transforming a characteristic of a signal (e.g., differentiation, integration, low pass filtering).

The modulator 150 is coupled to the compensation circuit 160 and the ramp generator 145. In the illustrated embodiment, the modulator 150 includes a switching cycle comparator 152, a duty cycle comparator 154, a summer 156 and a drive circuit 158 for driving the clamping switch $Q_2$. The summer 156 is coupled to the filter 180 and receives the intermediate signal $V_{INT}$ therefrom. The summer 156 combines the intermediate signal $V_{INT}$ and a second reference voltage $V_{REF2}$ to produce a switching cycle termination signal $V_{SCT}$ that is delivered to the switching cycle comparator 152. In the illustrated embodiment, the second reference voltage $V_{REF2}$ may be set at a level sufficient to provide a base switching frequency. The switching cycle comparator 152 receives the switching cycle termination signal $V_{SCT}$ and modifies the ramp signal $V_{RAMP}$ as a function thereof. In the illustrated embodiment, the switching cycle comparator 152 compares the switching cycle termination signal $V_{SCT}$ to the ramp signal $V_{AMP}$ to determine an appropriate time to turn on the timing switch $Q_{TS}$ and thereby reset the ramp signal $V_{RAMP}$. Of course, other methods of modifying the ramp signal $V_{RAMP}$ (e.g., changing a slope of the ramp signal $V_{RAMP}$) are well within the broad scope of the present invention.

The duty cycle comparator 154 then compares the error signal $V_{TH}$ to the ramp signal $V_{RAMP}$ and develops therefrom a drive signal for driving the power switch $Q_1$. The drive circuit 158 may, in one embodiment, invert the drive signal to develop a signal for driving the clamping switch $Q_2$. The duty cycle comparator 154 may thus establish a primary interval D (during which the power switch $Q_1$ is in the conduction mode) and an auxiliary interval 1-D (during which the power switch $Q_1$ is in the non-conduction mode). By modifying the ramp signal $V_{RAMP}$, the switching cycle comparator 152 may thus adjust the switching period of the power switch $Q_1$ as a function of the intermediate signal $V_{INT}$. The compensation circuit 160, therefore, may decrease a reaction delay of the power converter 100 to, for instance, a change in the output characteristic (such as the output voltage $V_{OUT}$ or output current $I_{OUT}$)

Figure 1B:
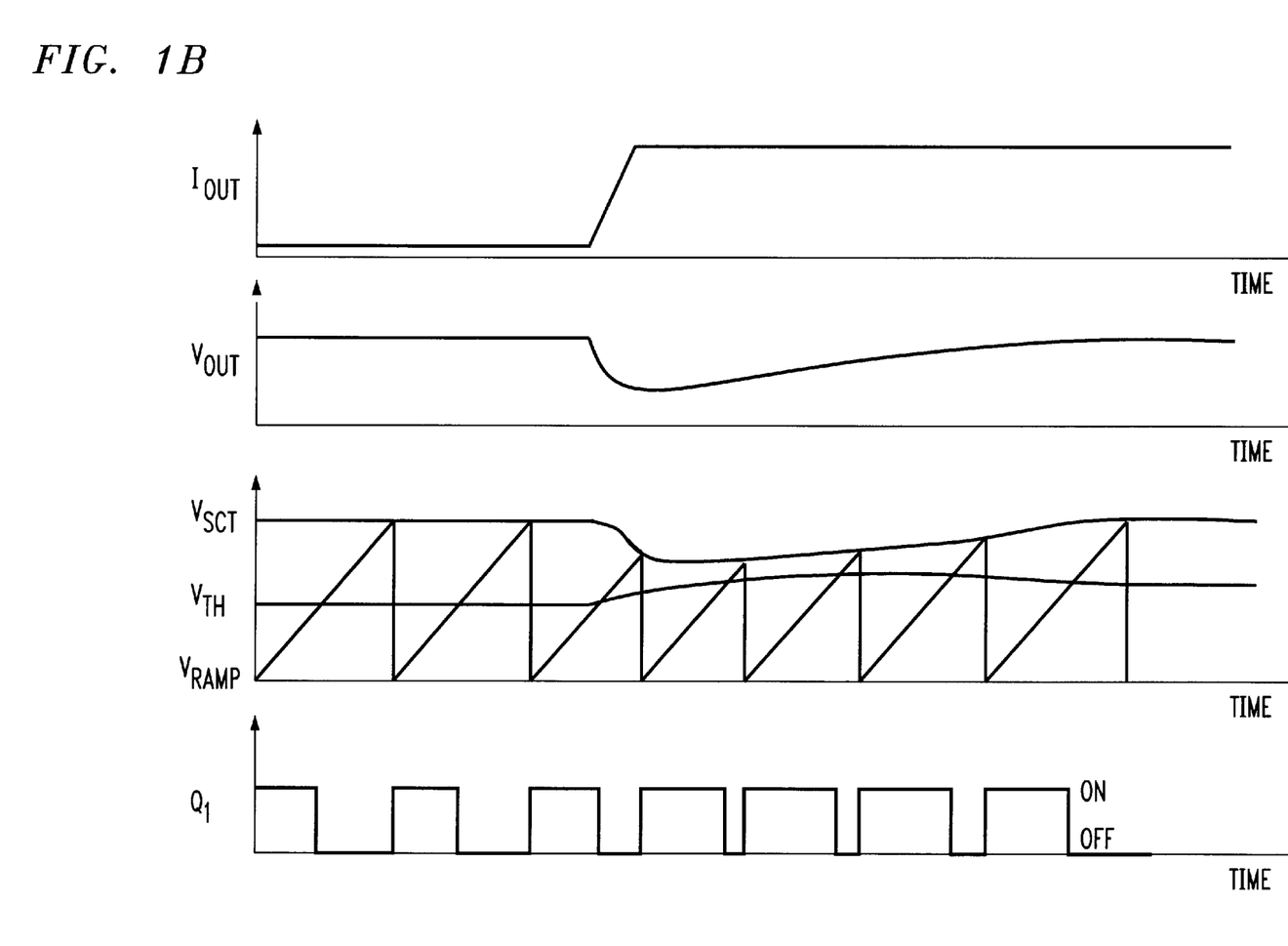
FIG. 1B illustrates graphical representations of waveforms associated with the power converter of FIG. 1A.

Turning now to FIG. 1B, illustrated are graphical representations of waveforms associated with the power converter 100 of FIG. 1A. The operation of the power converter 100 will therefore be discussed with continuing reference to FIGS. 1A and 1B. A fast, large amplitude step change in the output current $I_{OUT}$ generated by the load 190 causes a sudden drop in the output voltage $V_{OUT}$. The error signal $V_{TH}$, developed by comparing the output voltage $V_{OUT}$ to the reference voltage $V_{REF1}$, increases to indicate an increase in a scaled difference between the desired output voltage and the actual output voltage $V_{OUT}$. An increase in the error signal $V_{TH}$ causes the duty cycle comparator 154 to accordingly increase a period of the primary interval D such that the error signal $V_{TH}$ may be reduced to a nominal level.

In the illustrated embodiment, the filter 180 receives the error signal $V_{TH}$ and develops therefrom the intermediate signal $V_{INT}$, which is combined with the second reference voltage $V_{REF2}$ to produce the switching cycle termination signal $V_{SCT}$. As the intermediate signal $V_{INT}$ increases, the switching cycle termination signal $V_{SCT}$ decreases. Since the primary interval D ends when the ramp signal $V_{RAMP}$ has risen to a level substantially equal to the switching cycle termination signal $V_{SCT}$, the decrease in the switching cycle termination signal $V_{SCT}$ may thus allow the auxiliary interval 1-D to be shortened or terminated in response to, for example, an increase in the load current $I_{OUT}$ that causes a corresponding decrease in the output voltage $V_{OUT}$. The controller 140 may thus operate during both the primary interval D and the auxiliary interval 1-D.

Figure 2A:
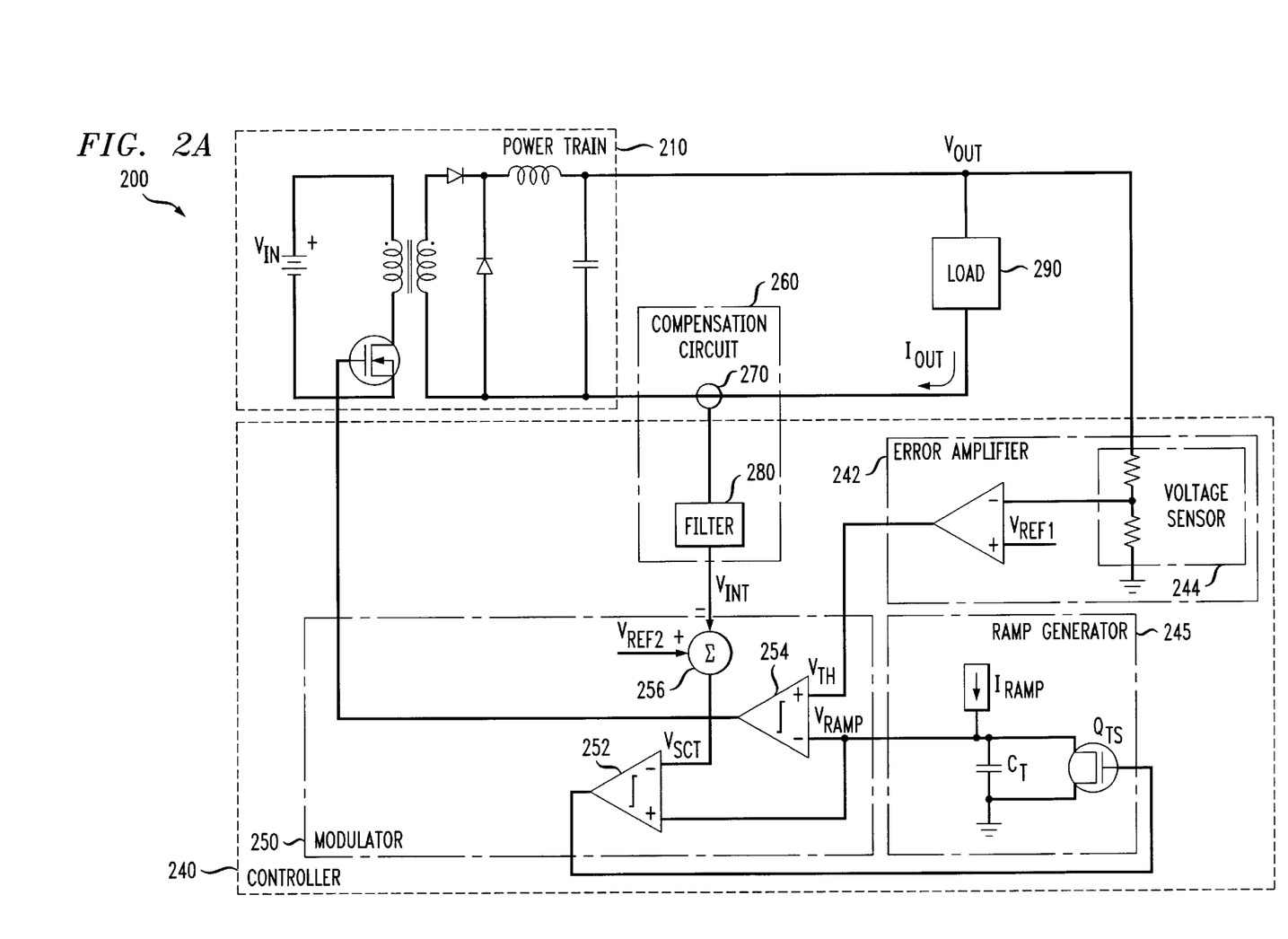
FIG. 2A illustrates a schematic diagram of another embodiment of a power converter constructed in accordance with the principles of the present invention.

Turning now to FIG. 2A, illustrated is a schematic diagram of another embodiment of a power converter 200 constructed in accordance with the principles of the present invention. The power converter 200 includes a power train 210 and a controller 240. The power train 210 receives an input voltage $V_{IN}$ and supplies an output voltage $V_{OUT}$ to a load 290 at an output of the power converter 200. The controller 240 includes an error amplifier 242, a ramp generator 245, a compensation circuit 260 and a modulator 250.

The error amplifier 242 is coupled to the output of the power converter 200 and the modulator 250. In the illustrated embodiment, the error amplifier 242 includes a voltage sensor (e.g., a voltage divider) 244 that develops a scaled output voltage. The error amplifier 242 compares the scaled output voltage to a reference voltage $V_{REF1}$ and develops therefrom an error signal $V_{TH}$ representing a scaled difference between a desired output voltage (represented by the reference voltage $V_{REF1}$) and the actual output voltage $V_{OUT}$.

The ramp generator 245 includes a current source $I_{RAMP}$ coupled to a timing switch $Q_{TS}$. The ramp generator 245 further includes a timing capacitor $C_T$ coupled across the timing switch $Q_{TS}$. The ramp generator 245 is analogous to the ramp generator 145 described with respect to FIG. 1A and will not be further described.

The compensation circuit 260 includes a sensor 270, coupled to an output of the power converter 200, that senses an output characteristic of the power converter 200. In the illustrated embodiment, the output characteristic is an output current $I_{OUT}$. The sensor 270 includes a current sensor coupled between the output of the power converter 200 and the load 290. In an alternative embodiment, the sensor 270 may include an observer circuit, parallel-coupled to an output capacitor (or an output inductor) of the power converter 200, that develops an output current signal representing the output current $I_{OUT}$. For a better understanding of observer circuits, see U.S. patent application Ser. No. 09/374,217 to Boylan, et al., entitled "System and Method for Determining Output Current and Converter Employing the Same," which is incorporated herein by reference in its entirety. Those skilled in the art realize, of course, that other sensors are well within the broad scope of the present invention. The sensor may, in an alternative embodiment, be adapted to sense an external signal indicative of a change in the output characteristic of the power converter 200. The compensation circuit 260 further includes a filter 280 coupled to the sensor 270. The filter 280 develops an intermediate signal $V_{INT}$ representing a change in the output current $I_{OUT}$ of the power converter 200. By developing the intermediate signal $V_{INT}$ directly from the output current $I_{OUT}$ of the power converter 200, the compensation circuit 260 may thus more rapidly respond to fast, large amplitude step changes in the output current $I_{OUT}$.

The modulator 250 is coupled to the ramp generator 245, the compensation circuit 260 and the error amplifier 242. In the illustrated embodiment, the modulator 250 includes a switching cycle comparator 252, a duty cycle comparator 254 and a summer 256. The modulator 250 is analogous to the modulator 150 illustrated and described with respect to the power converter 100 of FIG. 1A and, as a result, will not be described in detail. The modulator 250 receives the intermediate signal $V_{INT}$ from the compensation circuit 260 and adjusts the switching period of the drive signal as a function thereof, thereby decreasing a reaction delay of the power converter 200 to fast, large amplitude step changes in the output current $I_{OUT}$.

Figure 2B:
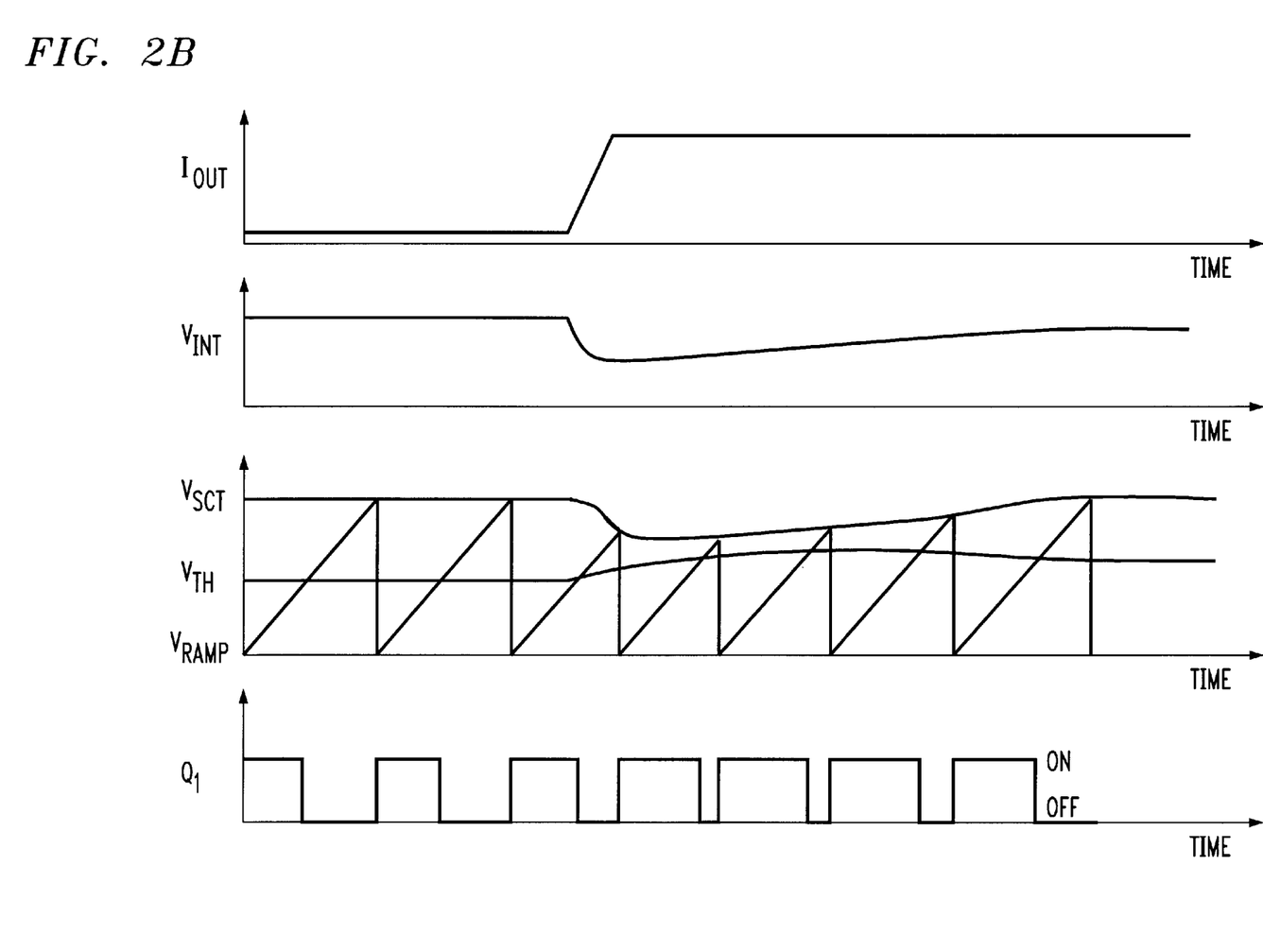
FIG. 2B illustrates graphical representations of waveforms associated with the power converter of FIG. 2A.

Turning now to FIG. 2B, illustrated are graphical representations of waveforms associated with the power converter 200 of FIG. 2A. The operation of the power converter 200 will therefore be discussed with continuing reference to FIGS. 2A and 2B. The load 290 may require a fast, large amplitude step change in the output current $I_{OUT}$. In the illustrated embodiment, the filter 280 receives the output current signal (representing the output current $I_{OUT}$) from the sensor 270 and develops therefrom the intermediate signal $V_{INT}$. The intermediate signal $V_{INT}$ is then combined with the second reference voltage $V_{REF2}$ to produce the switching cycle termination signal $V_{SCT}$. The switching cycle termination signal $V_{SCT}$ may be employed to shorten or terminate the auxiliary interval 1-D in response to fast, large amplitude step change in the output current $I_{OUT}$.

Figure 3A:
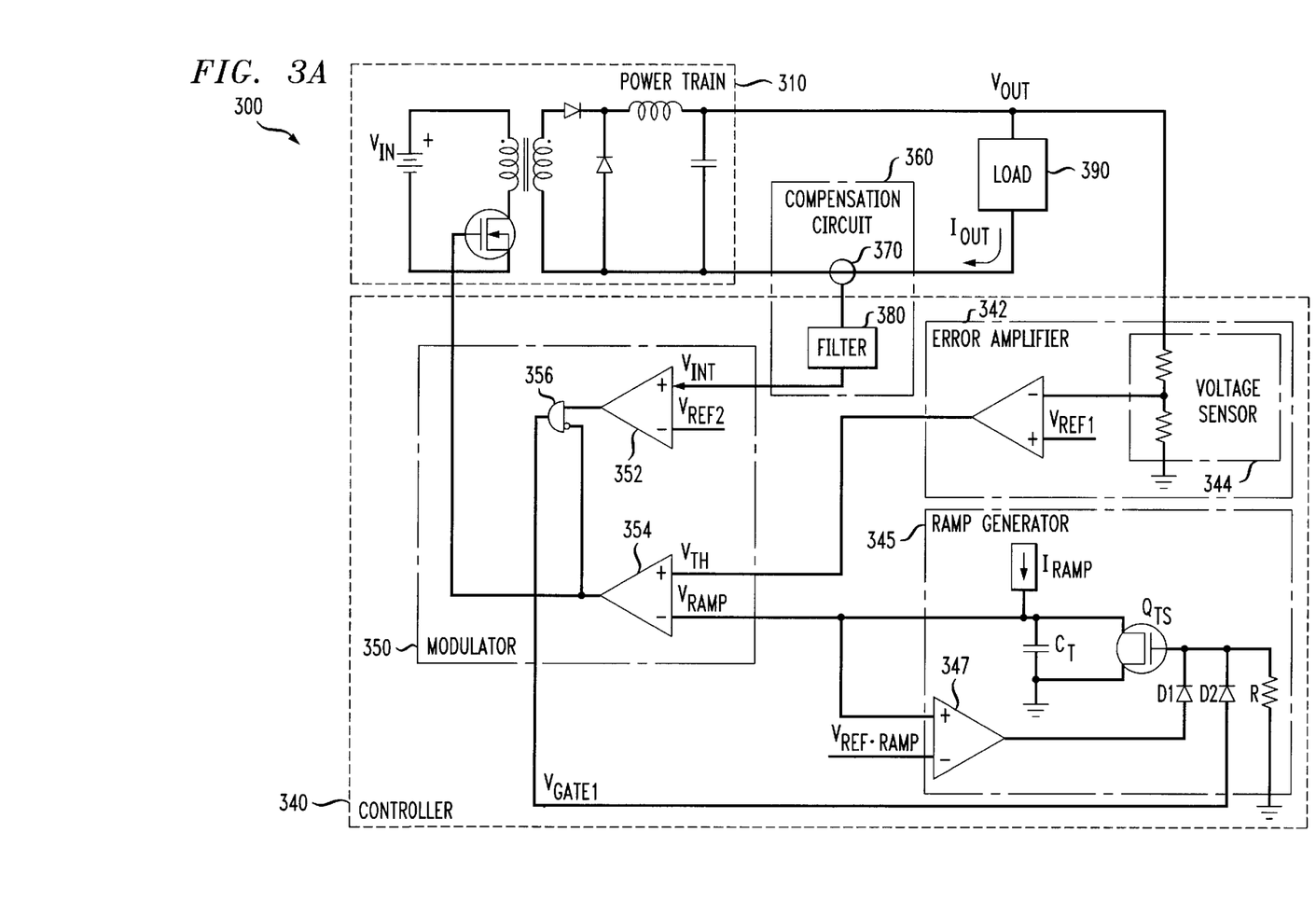
FIG. 3A illustrates a schematic diagram of another embodiment of a power converter constructed in accordance with the principles of the present invention.

Turning now to FIG. 3A, illustrated is a schematic diagram of another embodiment of a power converter 300 constructed in accordance with the principles of the present invention. The power converter 300 includes a power train 310 and a controller 340. The power train 310 receives an input voltage $V_{IN}$ and supplies an output voltage $V_{OUT}$ to a load 390 at an output of the power converter 300. The controller 340 includes an error amplifier 342, a ramp generator 345, a compensation circuit 360 and a modulator 350.

The error amplifier 342 is coupled to the output of the power converter 300 and the modulator 350. The error amplifier 342 is analogous to the error amplifier 242 illustrated and described with respect to FIG. 2A and, as a result, will not be described.

The ramp generator 345 includes a current source $I_{RAMP}$ coupled to a timing switch $Q_{TS}$. The ramp generator 345 further includes a timing capacitor $C_T$ coupled across the timing switch $Q_{TS}$. The ramp generator 345 still further includes a ramp reset comparator 347 coupled (via a first diode $D_1$) to the timing switch $Q_{TS}$. During a switching cycle, the current source $I_{RAMP}$ provides a current to charge the timing capacitor $C_T$, causing the ramp signal $V_{RAMP}$ to rise. Once the ramp signal $V_{RAMP}$ reaches a threshold equivalent to a ramp reference voltage $V_{REF-RAMP}$, the ramp reset comparator 347 ends the switching cycle by briefly turning on the timing switch $Q_{TS}$ to discharge the timing capacitor $C_T$ and reset the ramp signal $V_{RAMP}$. The timing switch $Q_{TS}$ then turns off to allow the current source $I_{RAMP}$ to recharge the timing capacitor $C_T$, thereby initiating another switching cycle.

The compensation circuit 360 includes a sensor 370, coupled to an output of the power converter 300, that senses an output current $I_{OUT}$ of the power converter 300. The compensation circuit 360 further includes a filter 380 coupled to the sensor 370. The filter 380 develops an intermediate signal $V_{INT}$ representing a change in the output current $I_{OUT}$ of the power converter 300. By developing the intermediate signal $V_{INT}$ directly from the output current $I_{OUT}$ of the power converter 300, the compensation circuit 260 may thus more rapidly respond to fast, large amplitude step changes in the output current $I_{OUT}$.

The modulator 350 is coupled to the ramp generator 345, the compensation circuit 360 and the error amplifier 342. In the illustrated embodiment, the modulator 350 includes a switching cycle comparator 352, a duty cycle comparator 354 and an AND circuit 356. The modulator 350 receives the intermediate signal $V_{INT}$ from the compensation circuit 360 and adjusts the switching period of the drive signal as a function thereof, thereby decreasing a reaction delay of the power converter 300 to fast, large amplitude step changes in the output current $I_{OUT}$. In the illustrated embodiment, the AND circuit 356 allows the switching cycle comparator 352 to adjust the switching period of the drive signal by terminating the switching cycle only during an auxiliary interval 1-D (when the power switch $Q_1$ is in a non-conduction mode). Of course, the AND circuit 356 may be omitted to allow the switching cycle comparator 352 to terminate the switching cycle without regard to the portion of the switching cycle (i.e., primary interval D or auxiliary interval 1-D).

Figure 3B:
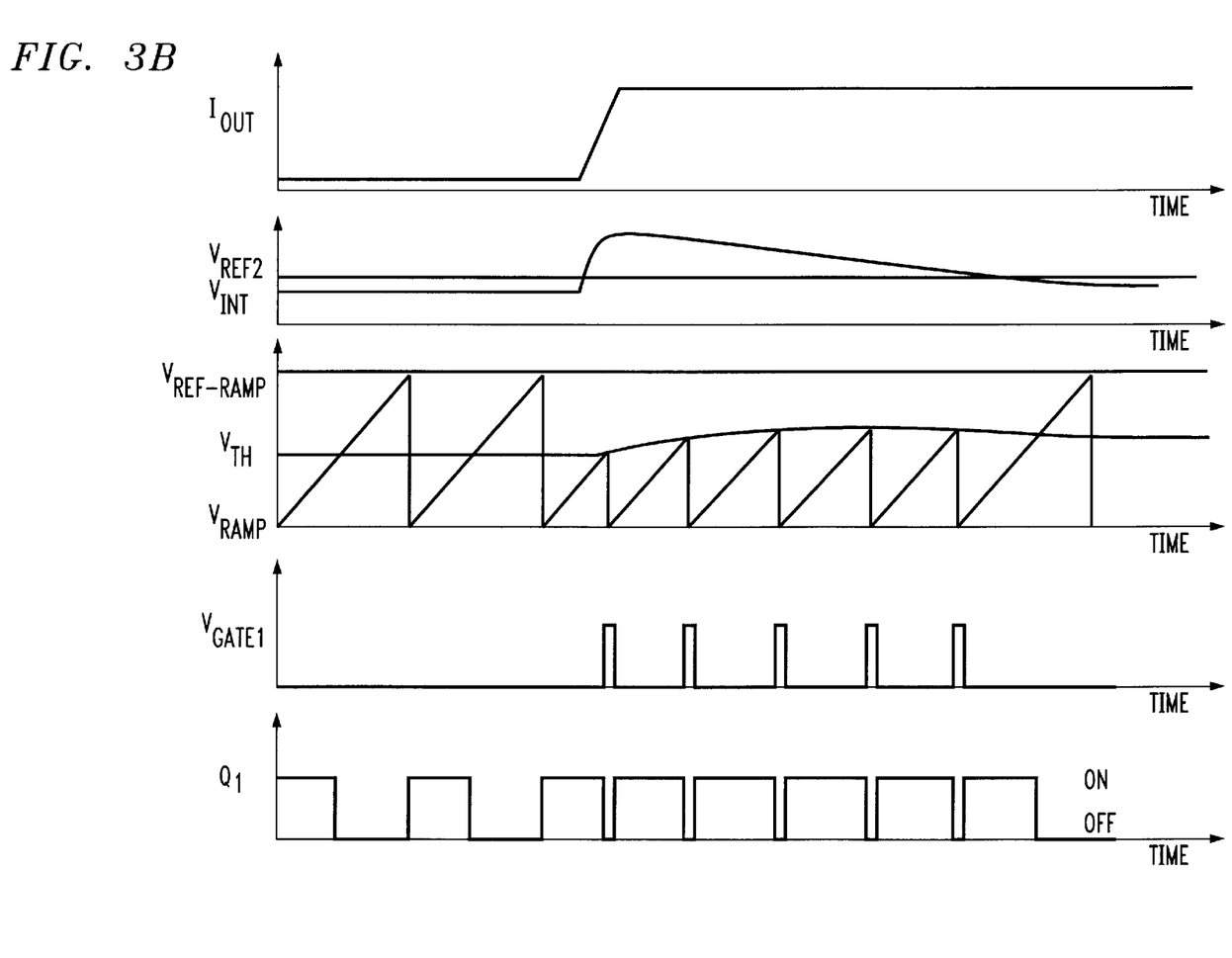
FIG. 3B illustrates graphical representations of waveforms associated with the power converter of FIG. 3A.

Turning now to FIG. 3B, illustrated are graphical representations of waveforms associated with the power converter 300 of FIG. 3A. The operation of the power converter 300 will therefore be discussed with continuing reference to FIGS. 3A and 3B. The load 390 may require a fast, large amplitude step change in the output current $I_{OUT}$. In the illustrated embodiment, the filter 380 receives the output current signal (representing the output current $I_{OUT}$) from the sensor 370 and develops therefrom the intermediate signal $V_{INT}$. The intermediate signal $V_{INT}$ is then compared with the second reference voltage $V_{REF2}$ to provide a signal to the AND circuit 356. The AND circuit 356 allows the switching cycle comparator 352 to shorten or terminate the period of the auxiliary interval 1-D (when the power switch $Q_1$ is in the non-conduction mode).

Figure 4A:
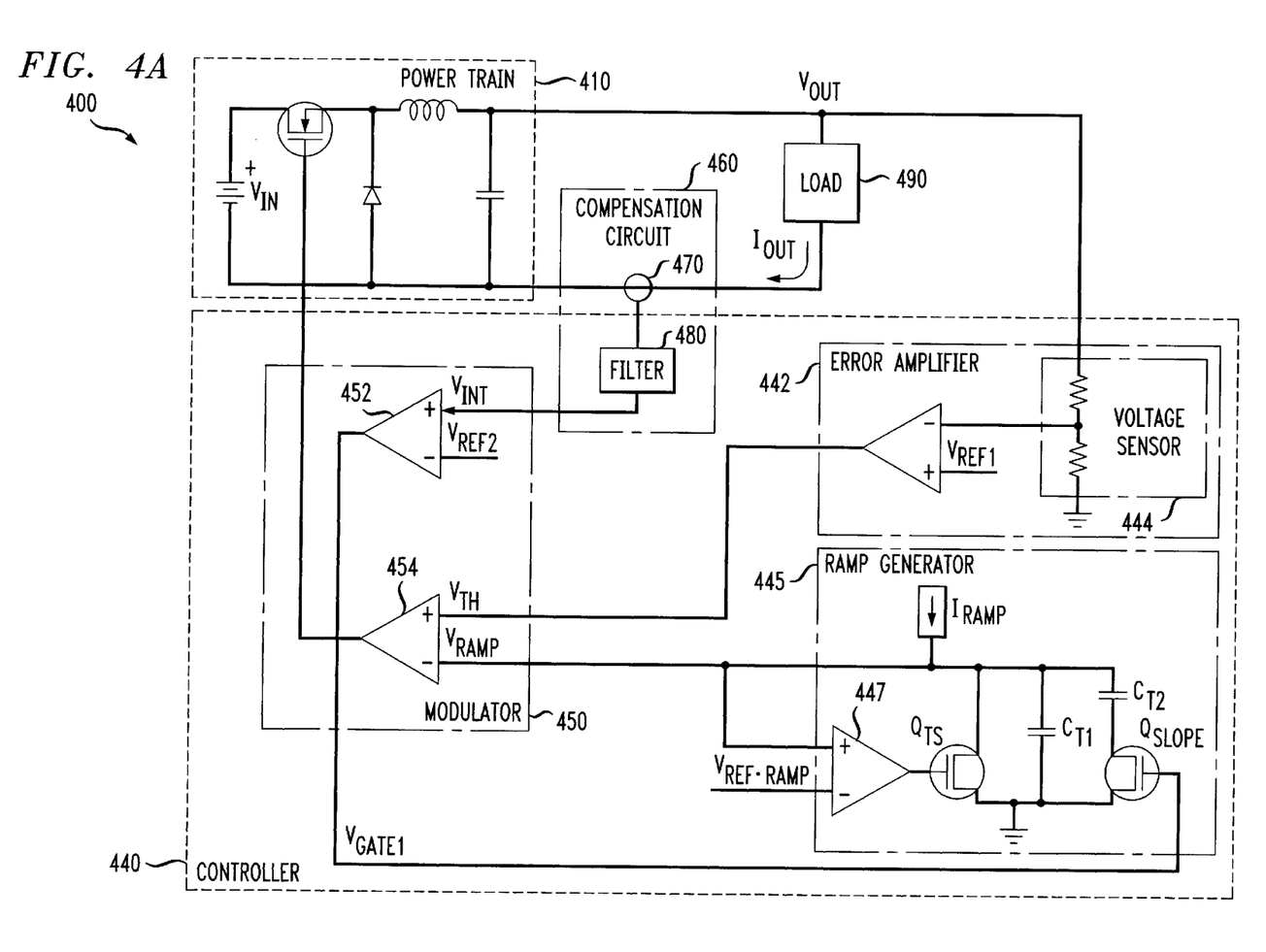
FIG. 4A illustrates a schematic diagram of yet another embodiment of a power converter constructed in accordance with the principles of the present invention.

Turning now to FIG. 4A, illustrated is a schematic diagram of yet another embodiment of a power converter 400 constructed in accordance with the principles of the present invention. The power converter 400 includes a power train 410 (illustrated as a buck converter) and a controller 440. The power train 410 receives an input voltage $V_{IN}$ and supplies an output voltage $V_{OUT}$ to a load 490 at an output of the power converter 400. While the power train 410 is illustrated as a buck converter, those skilled in the pertinent art realize that the principles of the present invention are applicable to a variety of converter topologies, including forward, flyback and buck-boost topologies. The controller 440 includes an error amplifier 442, a ramp generator 445, a compensation circuit 460 and a modulator 450.

The error amplifier 442 is coupled to the output of the power converter 400 and the modulator 450. In the illustrated embodiment, the error amplifier 442 includes a voltage sensor (e.g., a voltage divider) 444 that develops a scaled output voltage. The error amplifier 442 compares the scaled output voltage to a reference voltage $V_{REF1}$ and develops therefrom an error signal $V_{TH}$ representing a scaled difference between a desired output voltage (represented by the reference voltage $V_{REF1}$) and the actual output voltage $V_{OUT}$.

The ramp generator 445 includes a current source $I_{RAMP}$ coupled to a timing switch $Q_{TS}$. The ramp generator 445 further includes a first timing capacitor $C_{T1}$ coupled across the timing switch $Q_{TS}$. The ramp generator 445 further includes a series-coupled second timing capacitor $CT_2$ and slope modification switch $Q_{SLOPE}$, coupled across the timing switch $Q_{TS}$. During a normal switching cycle, the slope modification switch $Q_{SLOPE}$ is on and the current source $I_{RAMP}$ provides a current to charge both the first and second timing capacitors $C_{T1}$, $CT_2$ to cause the ramp signal $V_{RAMP}$ to rise. Then, at the end of the switching cycle, the timing switch $Q_{TS}$ turns on briefly to discharge the first and second timing capacitors $C_{T1}$, $CT_2$ and reset the ramp signal $V_{RAMP}$. The timing switch $Q_{TS}$ then turns off to allow the current source $I_{RAMP}$ to recharge the timing capacitor $C_T$, thereby initiating another switching cycle.

The compensation circuit 460 includes a sensor 470, coupled to an output of the power converter 400, that senses an output current $I_{OUT}$ of the power converter 400. The compensation circuit 460 further includes a filter 480 coupled to the sensor 470. The filter 480 develops an intermediate signal $V_{INT}$ representing a change in the output current $I_{OUT}$ of the power converter 400. By developing the intermediate signal $V_{INT}$ directly from the output current $I_{OUT}$ of the power converter 400, the compensation circuit 460 may thus more rapidly respond to fast, large amplitude step changes in the output current $I_{OUT}$.

The modulator 450 is coupled to the ramp generator 445, the compensation circuit 460 and the error amplifier 442. In the illustrated embodiment, the modulator 450 includes a switching cycle comparator 452 and a duty cycle comparator 454. The modulator 450 receives the intermediate signal $V_{INT}$ from the compensation circuit 460 and operates the slope modification switch $Q_{SLOPE}$ in response thereto. For example, the modulator 450 may turn off the slope modification switch $Q_{SLOPE}$ in response to a fast, large amplitude step change in the output current $I^{OUT}$. By turning off the slope modification switch $Q_{SLOPE}$, the modulator 450 may thus change the switching frequency of the ramp signal $V_{RAMP}$ to thereby decrease a reaction delay of the power converter 400 to fast, large amplitude step changes in the output current $I_{OUT}$. Alternatively, the slope of the ramp signal $V_{RAMP}$ may be modified by adjusting the current source $I_{RAMP}$ in response to the intermediate signal $V_{INT}$.

Figure 4B:
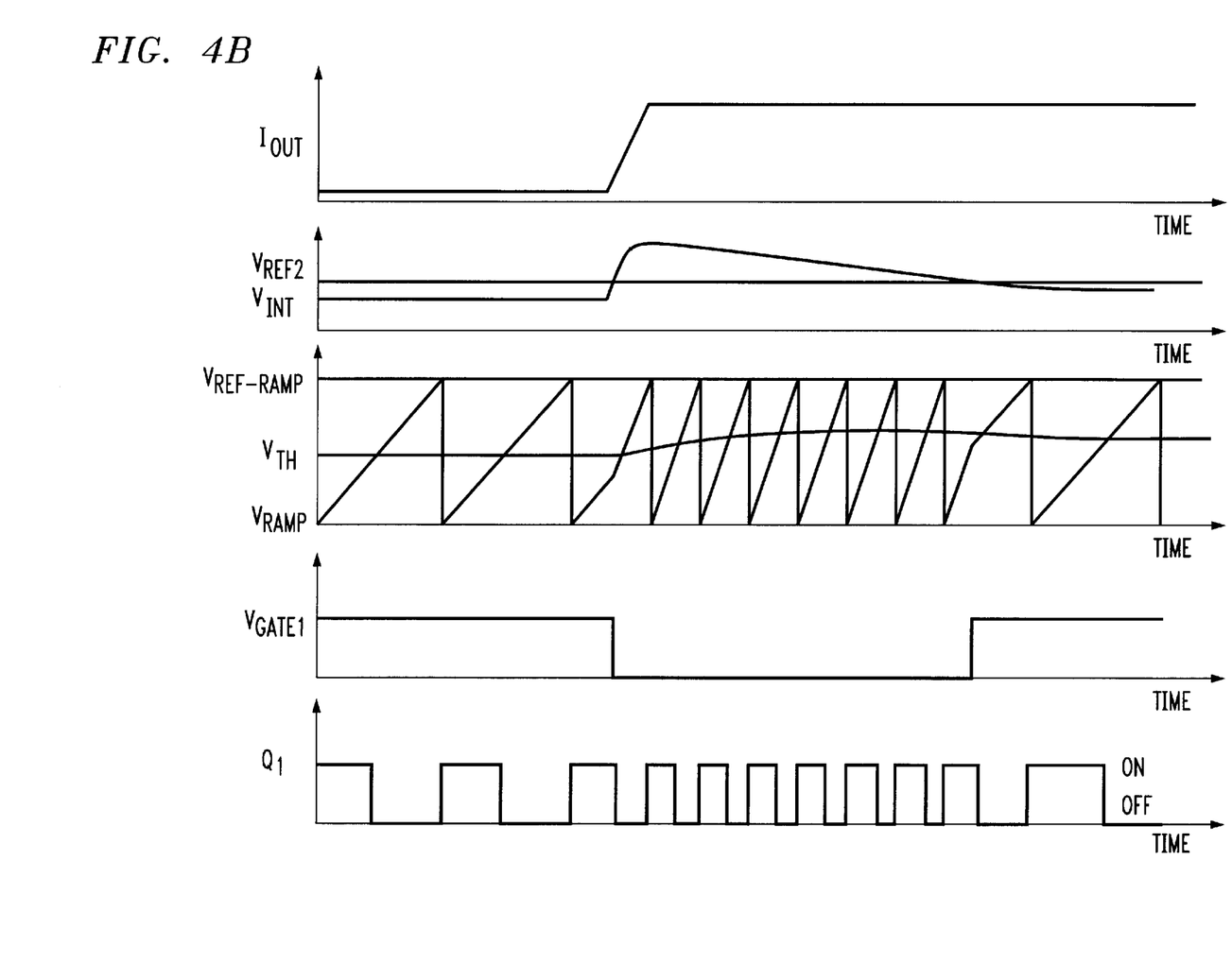
FIG. 4B illustrates graphical representations of waveforms associated with the power converter of FIG. 4A.

Turning now to FIG. 4B, illustrated are graphical representations of waveforms associated with the power converter 400 of FIG. 4A. The operation of the power converter 400 will therefore be discussed with continuing reference to FIGS. 4A and 4B. The load 490 may require a fast, large amplitude step change in the output current $I_{OUT}$. The filter 480 receives the output current signal (representing the output current $I_{OUT}$) from the sensor 470 and develops therefrom the intermediate signal $V_{INT}$. The intermediate signal $V_{INT}$ is then combined with the second reference voltage $V_{REF2}$ to produce a slope modification signal $V_{GATE1}$ that is employed by the ramp generator 445 to change a the switching frequency of the ramp signal $V_{RAMP}$. The controller 440 may thus decrease a reaction delay of the power converter 400 to fast, large amplitude step changes in the output current $I_{OUT}$.

Those skilled in the art should understand that the previously described embodiments of the compensation circuit and related method are submitted for illustrative purposes only and other embodiments capable of decreasing a reaction delay of a converter are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power circuit topologies, including circuit topologies not employing an active clamp. Additionally, the principles of the present invention may be applied to various half bridge, full bridge, flyback, and boost converter topologies employing discrete or integrated magnetics. For a better understanding of a variety of power converter topologies employing discrete and integrated magnetic techniques, see *Modern DC-to-DC Switch mode Power Converter Circuits*, by Rudolph P. Severns and Gordon Bloom, Van Nostrand Reinhold Company, New York, N.Y. (1985) and U.S. Pat. No. 5,262,930 to Hua, entitled *Zero-Voltage Transition PWM Converters*, issued Nov. 16, 1993, which are incorporated herein by reference in their entirety.

Although the present invention has been described in detail, those skilled in the art should understand that they can make various changes, substitutions and alterations herein without departing from the spirit and scope of the invention in its broadest form.

What is claimed is:

1. For use with a switched-mode power converter having a modulator that develops a drive signal for a power switch, a compensation circuit, comprising:
   a sensor that senses an output characteristic of said converter; and
   a filter, coupled to said sensor, that develops an intermediate signal representing a change in said output characteristic, said modulator adjusting a switching period of said drive signal as a function of said intermediate signal thereby to decrease a reaction delay of said converter.

2. The circuit as recited in claim 1 wherein said converter further has a ramp generator that generates a ramp signal, said modulator comprising a switching cycle comparator that modifies said ramp signal as a function of said intermediate signal thereby to adjust said switching period.

3. The circuit as recited in claim 2 wherein said switching cycle comparator modifies said ramp signal by resetting said ramp signal.

4. The circuit as recited in claim 2 wherein said switching cycle comparator modifies said ramp signal by changing a slope of said ramp signal.

5. The circuit as recited in claim 1 wherein said output characteristic is an output voltage of said converter, said converter further having a ramp generator that generates a ramp signal and an error amplifier that compares said output voltage to a reference voltage and develops therefrom an error signal, said modulator comprising a duty cycle comparator that receives said ramp signal and said error signal and develops therefrom said drive signal.

6. The circuit as recited in claim 1 wherein said output characteristic is an output voltage of said converter, said compensation circuit further comprising an error amplifier that compares said output voltage to a reference voltage and develops therefrom an error signal, said filter developing said intermediate signal as a function of a change in said error signal.

7. The circuit as recited in claim 1 wherein said output characteristic is an output current of said converter and said converter further has an output capacitor, said sensor comprising an observer circuit, parallel-coupled to said output capacitor, that develops an output current signal representing said output current, said filter developing said intermediate signal as a function of said output current signal.

8. For use with a switched-mode power converter having a modulator that develops a drive signal for a power switch, a method of compensating for a change in an output characteristic of said converter, comprising:

sensing said output characteristic of said converter;

developing an intermediate signal representing said change in said output characteristic, and adjusting a switching period of said drive signal as a function of said intermediate signal thereby to decrease a reaction delay of said converter.

9. The method as recited in claim 8 wherein said adjusting comprises modifying a ramp signal as a function of said intermediate signal.

10. The method as recited in claim 9 wherein said modifying comprises resetting said ramp signal.

11. The method as recited in claim 9 wherein said modifying comprises changing a slope of said ramp signal.

12. The method as recited in claim 8 wherein said output characteristic is an output voltage of said converter, said method further comprising receiving a ramp signal and an error signal representing an error in said output voltage and developing therefrom said drive signal.

13. The method as recited in claim 8 wherein said output characteristic is an output voltage of said converter, said method further comprising comparing said output voltage to a reference voltage and developing therefrom an error signal, said developing comprising developing said intermediate signal as a function of a change in said error signal.

14. The method as recited in claim 8 wherein said output characteristic is an output current of said converter and said converter further has an output capacitor, said sensing comprising developing an output current signal representing said output current with an observer circuit parallel-coupled to said output capacitor, said developing comprising developing said intermediate signal as a function of said output current signal.

15. A switched-mode power converter, comprising:

at least one power switch;

a modulator, coupled to said power switch, that develops a drive signal for said power switch; and a compensation circuit, comprising:

a sensor that senses an output characteristic of said converter; and a filter, coupled to said sensor, that develops an intermediate signal representing a change in said output characteristic, said modulator adjusting a switching period of said drive signal as a function of said intermediate signal thereby to decrease a reaction delay of said converter.

16. The converter as recited in claim 15 further comprising a ramp generator that generates a ramp signal, said modulator comprising a switching cycle comparator that modifies said ramp signal as a function of said intermediate signal thereby to adjusting said switching period.

17. The converter as recited in claim 16 wherein said switching cycle comparator modifies said ramp signal by resetting said ramp signal.

18. The converter as recited in claim 16 wherein said switching cycle comparator modifies said ramp signal by changing a slope of said ramp signal.

19. The converter as recited in claim 15 wherein said output characteristic is an output voltage of said converter, said converter further comprising a ramp generator that generates a ramp signal and an error amplifier that compares said output voltage to a reference voltage and develops therefrom an error signal, said modulator comprising a duty cycle comparator that receives said ramp signal and said error signal and develops therefrom said drive signal.

20. The converter as recited in claim 15 wherein said output characteristic is an output voltage of said converter, said converter further comprising an error amplifier that compares said output voltage to a reference voltage and develops therefrom an error signal, said filter developing said intermediate signal as a function of a change in said error signal.

21. The converter as recited in claim 15 wherein said output characteristic is an output current of said converter, said converter further comprising an output capacitor, said sensor comprising an observer circuit, parallel-coupled to said output capacitor, that develops an output current signal representing said output current, said filter developing said intermediate signal as a function of said output current signal.

22. The converter as recited in claim 15 further comprising a ramp generator that generates a ramp signal and an error amplifier that compares said output voltage to a reference voltage and develops therefrom an error signal, said modulator comprising a duty cycle comparator that receives said ramp signal and said error signal and develops therefrom said drive signal.

* * * * *